United States Patent
Rozendaal et al.

[11] Patent Number: 6,076,611
[45] Date of Patent: Jun. 20, 2000

[54] IMPLEMENT MOUNTED DEPTH CONTROL SYSTEM

[75] Inventors: Dennis L. Rozendaal, Coldwater; Richard R. Anderson, St. Marys, both of Ohio

[73] Assignee: AGCO Corporation, Duluth, Ga.

[21] Appl. No.: 09/213,216

[22] Filed: Dec. 17, 1998

[51] Int. Cl.⁷ .................................................. A01B 63/111
[52] U.S. Cl. ............................... 172/4; 172/2; 172/322; 172/474
[58] Field of Search ................................. 172/2, 4, 4.5, 5, 172/7, 8, 317, 318, 322, 474, 491, 439, 442

[56] References Cited

U.S. PATENT DOCUMENTS

| | | | |
|---|---|---|---|
| 4,132,272 | 1/1979 | Holloway et al. | 172/2 |
| 4,343,365 | 8/1982 | Rajagopal et al. | 172/4 |
| 4,355,688 | 10/1982 | Hamm et al. | 172/4 |
| 4,535,849 | 8/1985 | Dietrich, Sr. | 172/468 |
| 4,782,201 | 11/1988 | Pollard et al. | 200/61.44 |
| 4,865,132 | 9/1989 | Moore, Jr. | 172/196 |
| 4,969,527 | 11/1990 | Boe et al. | 172/7 |
| 5,012,415 | 4/1991 | Boe et al. | 364/424.07 |
| 5,143,159 | 9/1992 | Young et al. | 172/8 |
| 5,152,347 | 10/1992 | Miller | 172/7 |
| 5,300,918 | 4/1994 | Becker | 338/196 |
| 5,339,906 | 8/1994 | Fox et al. | 172/4 |
| 5,442,992 | 8/1995 | Sanner et al. | 91/428 |
| 5,526,916 | 6/1996 | Amadahl et al. | 194/211 |
| 5,579,850 | 12/1996 | Kimura et al. | 172/4 |
| 5,653,292 | 8/1997 | Ptacek et al. | 172/4 |
| 5,778,755 | 7/1998 | Boese | 91/399 |
| 5,833,010 | 11/1998 | Scott et al. | 172/126 |

FOREIGN PATENT DOCUMENTS 658977  3/1963  Canada.

*Primary Examiner*—Robert E. Pezzuto
*Assistant Examiner*—Nathan Mammen
*Attorney, Agent, or Firm*—Biebel & French

[57] ABSTRACT

A depth control system for controlling the working depth of an implement. The depth control system includes a monitor having an automatic mode of operation and a manual mode of operation wherein the automatic mode of operation provides preset, discrete working depth positions for the implement, and the manual mode of operation provides a continuous range of selectable positions. The monitor receives input signals from a position sensor mounted to the frame of the implement, and the position sensor includes a movable arm in sliding contact with an actuator arm mounted to a rock shaft of the implement whereby movement of the rock shaft and actuator arm causes the movable arm of the position sensor to move and provide different input signals to the monitor corresponding to the different positions of the rock shaft. The monitor provides an output signal to a hydraulic valve for controlling one or more hydraulic cylinders which actuate the rock shaft in movement to position the working depth of the implement. The monitor compares the input signal from the position sensor to an operator selected position, and provides an output signal to the hydraulic valve to cause the hydraulic cylinders to be actuated until the input signal matches the operator selected position. The hydraulic valve, position sensor and actuator arm include brackets for facilitating retrofit of the depth control system to an existing implement.

19 Claims, 4 Drawing Sheets

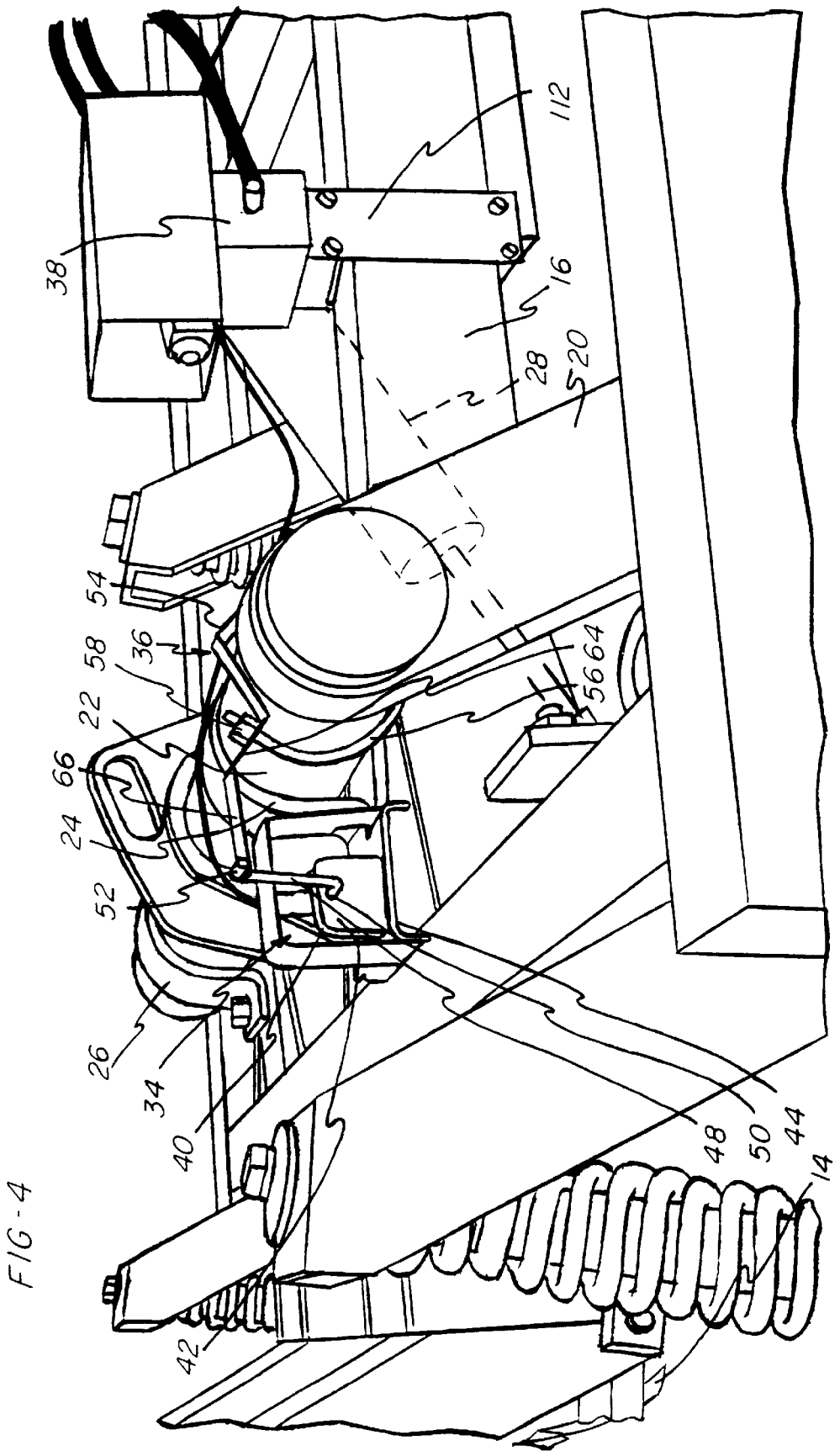

6,076,611

IMPLEMENT MOUNTED DEPTH CONTROL SYSTEM

BACKGROUND OF THE INVENTION

1. Field of the Invention

The present invention relates generally to agricultural implements and, more particularly, to a depth control system which is mountable to an implement for controlling the height of the implement, and which incorporates a cab mounted monitor for controlling a desired depth for the implement.

2. Related Prior Art

Various control mechanisms have been proposed for controlling the depth setting for implements such as field cultivators and other implements for which there is a need to maintain a predetermined soil penetration depth. Many of the improvements have been directed to providing control of the three point hitch on a tractor supporting the implement. For example, electronic control systems including electronic microprocessors have been combined with the hydromechanical systems of tractors in order to provide more precise control of the valving controlling the position of the links for the three point hitch.

Examples of prior art electronic position control systems for controlling the position of a linkage supporting an implement on a tractor include U.S. Pat. Nos. 4,343,365 to Rajagopal et al., 4,132,272 to Holloway et al. and 5,012,415 to Boe et al. While tractors provided with the devices disclosed in these patents provide improved position control for the implements supported on the tractor, the position sensing is provided at the tractor rather than at the implement adjacent to the soil engaging tool, such that the position sensing operation is performed at a location distanced from the actual work area of the tool. In such a control system, it is difficult to provide accurate feedback as to the precise position or depth penetration of the tools. Further, such systems are typically factory installed and do not address the problem of providing a depth control system for use with implements engaged on tractors which do not have such depth control systems.

U.S. Pat. No. 4,355,688 to Hamm et al. discloses an agricultural implement and associated depth control system wherein the depth control system is mounted to the implement and actuates a cylinder for positioning the height of the implement relative to the soil, depending on varying soil conditions to maintain a preselected tillage depth. This control system requires that the selected tillage depth be adjusted at the implement, and does not include a control for permitting an operator to selectively adjust the depth from the cab of the tractor. In addition, this depth control device provides a control which varies the depth positioning of the implement depending on varying responses from a vertically pivoting wheel which is in contact with the tilled ground, and accordingly would not be functional to provide exact control of a fixed working depth such as is required during a tillage operation by a field cultivator.

Accordingly, there is a need for a control system for providing accurate depth control of an implement wherein the depth control system may be operated from the cab of a tractor, and wherein the control system may be used with a wide range of tractors and implements.

SUMMARY OF THE INVENTION

The present invention is directed to a depth control system for use on implements, and operable with a wide range of tractors for pulling the implements. In a specific embodiment of the invention, the present depth control system provides accurate incremental depth control for a tillage implement utilizing existing depth control cylinders on the implement.

Generally, the present depth control system is designed for use in combination with an implement having a frame, ground engaging tools, at least one frame supporting wheel mounted to a rock shaft rotatably supported on the frame, and an actuator mechanism such as a hydraulic cylinder for moving the frame supporting wheel to a desired position relative to the frame to adjust the working depth of the tools. The control system also includes a monitor for mounting on a tractor connected to the implement, a position sensor mounted to the frame of the implement and connected to the monitor for providing an input signal corresponding to a sensed rotational position of the rock shaft, and consequently the working depth of the tools mounted to the implement frame. The monitor generates an output signal for controlling the actuator mechanism whereby the actuator mechanism is activated to move the frame supporting wheel to an operator selected position to position the tools at a desired working depth.

The monitor is operable in an automatic mode of operation and a manual mode of operation wherein the automatic mode of operation includes a plurality of preset, discrete positions for the frame supporting wheel, and the monitor includes a control for selecting each of the preset, discrete positions. An additional control is provided for the manual mode of operation wherein the manual control permits an operator to raise and lower the frame supporting wheel through a continuous range of positions relative to the frame, while a desired setting for the automatic mode of operation may remain unchanged on the monitor.

The position sensor includes a movable sensor arm which is mounted for rotation about a pivot axis. The sensor arm includes a bearing surface which is engaged in sliding engagement by an actuator arm mounted to the rock shaft. The actuator arm is releasably clamped onto the rock shaft and is rotatable around the rock shaft for adjusting the position of the actuator arm relative to the sensor arm of the position sensor. In addition, the position sensor is adapted to be bolted onto the implement frame such that the position sensor and actuator arm are designed to be retrofit onto an existing implement.

Therefore, it is an object of the present invention to provide a depth control system which is adapted to be mounted to an existing implement.

It is another object of the invention to provide a depth control system for an implement, the depth control system incorporating a sensor actuated by an actuator arm which is movable relative to the sensor.

It is a further object of the invention to provide a depth control system including a monitor for monitoring the actual depth of tools for the implement and for providing an output signal to match the actual depth setting to a preselected setting.

It is another object of the invention to provide a depth control system including a monitor having an automatic mode of operation and a manual mode of operation to facilitate convenient positioning of the working depth of the tools for the implement.

Other objects and advantages of the invention will be apparent from the following description, the accompanying drawings and the appended claims.

BRIEF DESCRIPTION OF THE DRAWINGS

FIG. 4 is a perspective view showing the position sensor in a fully raised position of the implement.

DETAILED DESCRIPTION OF THE PREFERRED EMBODIMENT

Figure 1:
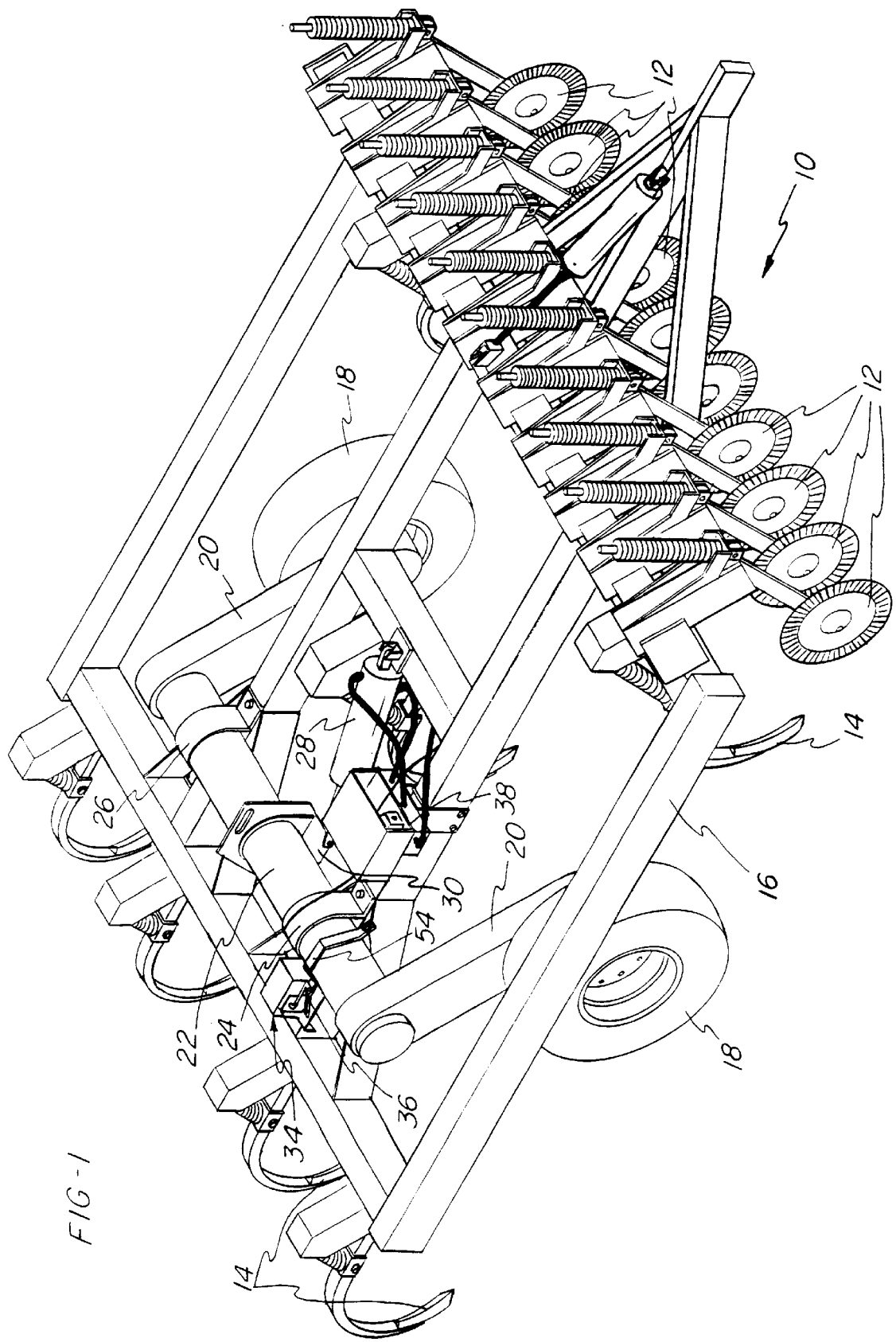
FIG. 1 is a perspective view of an implement incorporating the depth control system of the present invention.

Referring initially to FIG. 1, the present depth control system is adapted to be used in combination with an implement 10, which in the illustrated embodiment is a tillage implement including ground engaging tools comprising disks 12 and chisel plows 14. The tools 12, 14 are supported on an implement frame 16, and the frame 16 is supported above the ground by a pair of frame supporting wheels 18. The frame supporting wheels 18 are mounted to wheel mounting spars 20 which are rigidly attached to a rock shaft 22.

Figure 3:
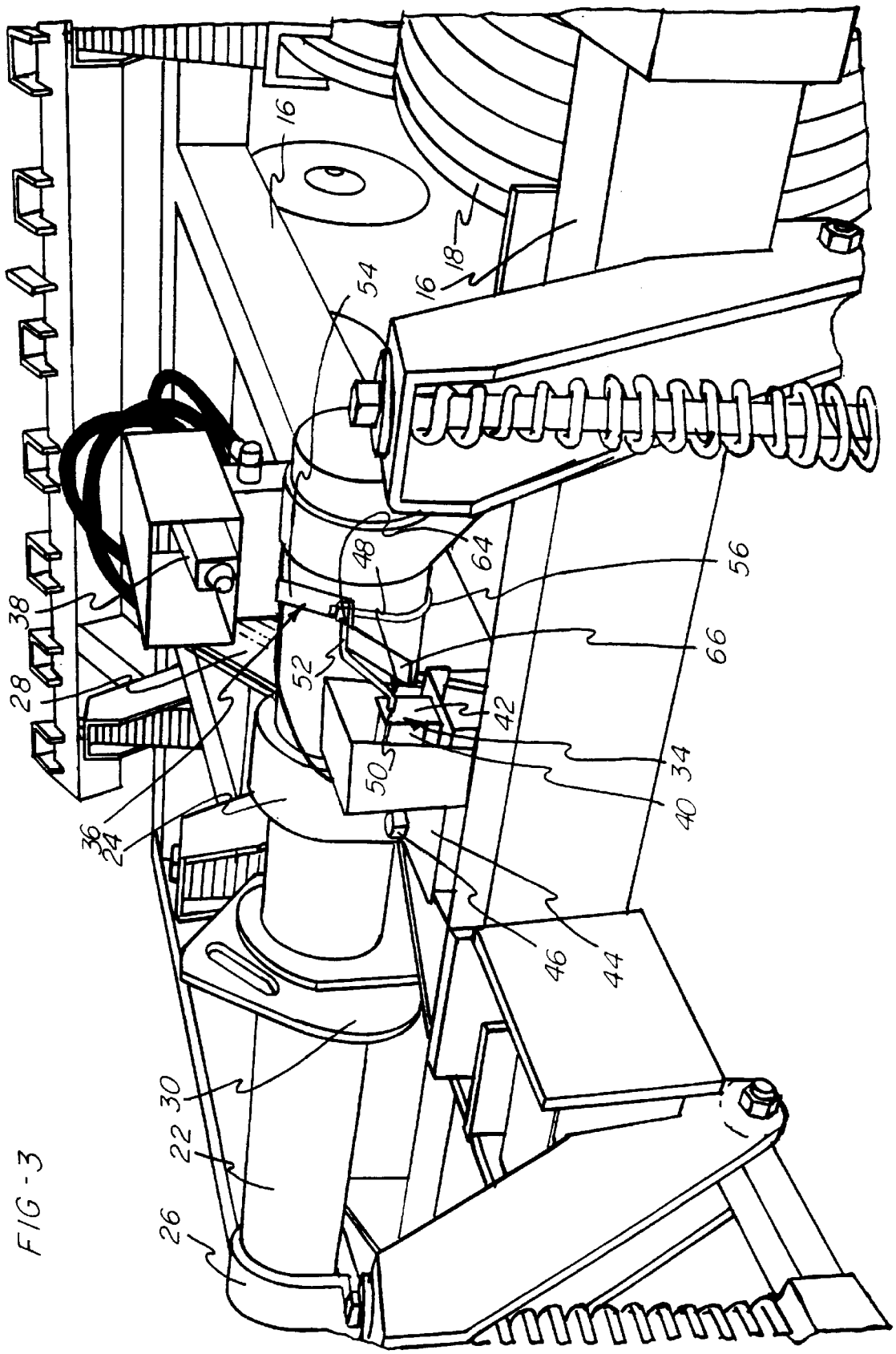
FIG. 3 is a perspective view showing the position sensor in a fully lowered position of the implement.

Referring further to FIG. 3, the rock shaft 22 is mounted to the frame 16 by rock shaft bearings 24, 26 which support the rock shaft 22 for rotational movement relative to the frame 16. The rock shaft 22 is actuated for rotating movement by an actuation mechanism including a hydraulic cylinder 28 extending between the frame 16 and a downwardly extending weldment 30. Thus, actuation of the cylinder 28 actuates the rock shaft 22 to pivot within the bearings 24, 26 to move the frame supporting wheels 18 upwardly or downwardly to raise or lower the working depth of the tools 12, 14.

Figure 2:
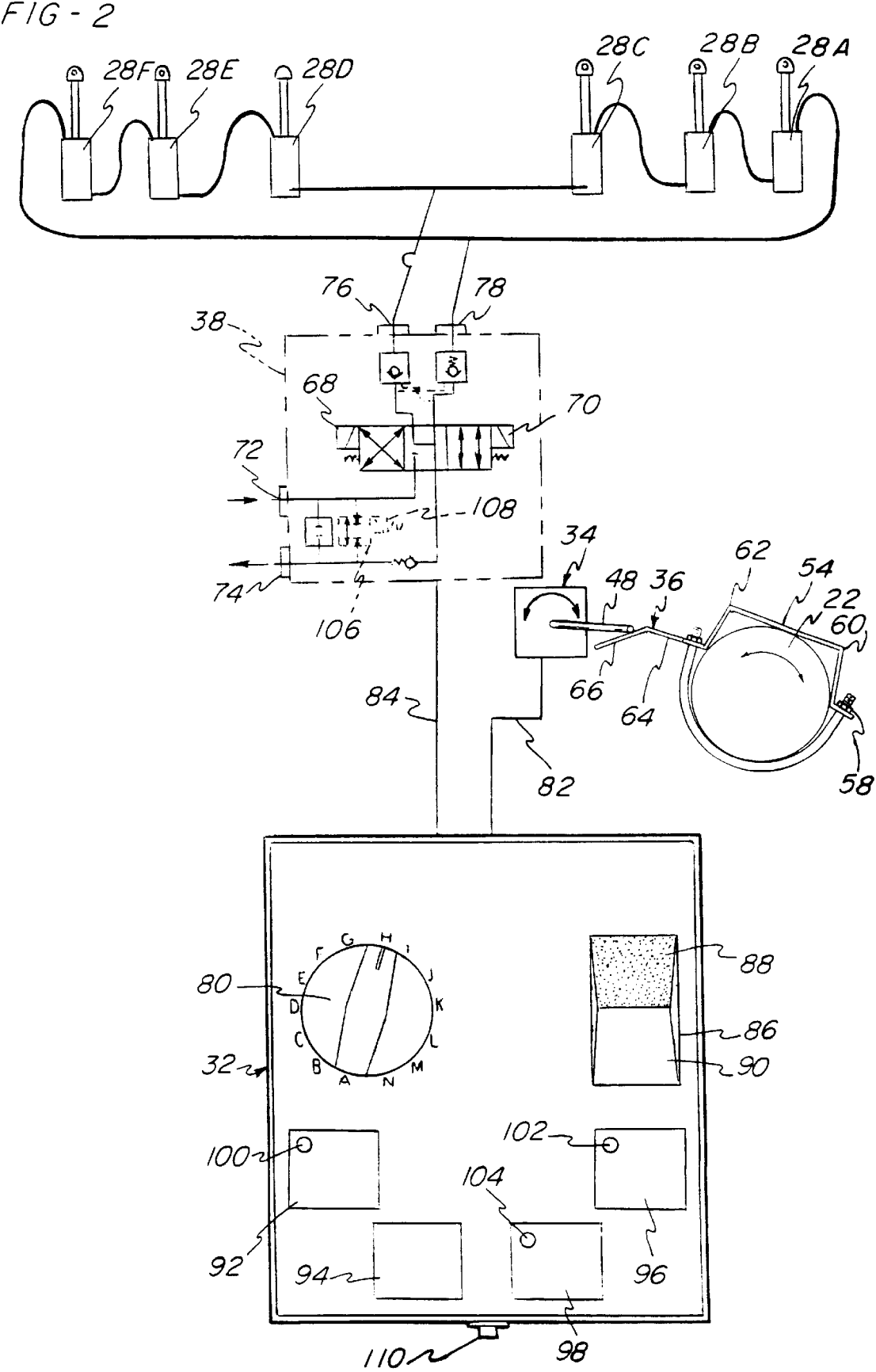
FIG. 2 is a schematic diagram illustrating the depth control system.

Referring to FIG. 2, the depth control system is illustrated diagrammatically and includes a monitor 32, a position sensor 34 connected to the monitor 32 for providing an input signal to the monitor 32, an actuator arm 36 positioned adjacent to the position sensor 34 for actuating the position sensor 34, and an actuation mechanism including a hydraulic valve 38 receiving an output signal from the monitor 32 and for controlling flow of hydraulic fluid to cylinders 28A–F wherein it should be understood that reference numeral 28 is hereinafter used to reference one or more cylinders 28A–F. With regard to the hydraulic cylinders 28A–F, it should be noted that although only one hydraulic cylinder 28 is shown in FIG. 1, the present depth control system may provide hydraulic fluid control for a plurality of cylinders 28, depending on the size of the implement, wherein the cylinders 28 are rephasing cylinders permitting connection of the cylinders 28 in series whereby the cylinders 28 simultaneously undergo the same extent of movement.

A particular advantage of the present invention relates to its adaptability to be mounted to existing implements and, referring further to FIG. 3, the mounting of the position sensor 34 and associated actuator arm 36 is further illustrated. The position sensor 34 comprises a potentiometer 40 supported on a vertical bracket 42. The vertical bracket is mounted to a horizontal bracket 44 which is bolted to the frame 16. In particular, the position sensor 34 is preferably attached to the frame 16 by an existing rock shaft bearing bolt 46 for fastening the rock shaft bearing 24.

The position sensor 34 further comprises a movable sensor arm 48 having one end 50 supported for pivotal movement at the potentiometer 40, and an opposing end 52 defining a bearing surface for engagement with the actuator arm 36. As may be best seen in FIG. 4, the actuator arm 36 comprises a relatively narrow metal strip having a generally U-shaped shaft engaging portion 54 which is fastened to the rock shaft with a U-bolt 56 having threaded ends engaged by nuts 58 thereby defining a saddle clamp. In addition, the U-shaped portion 54 is defined by bends 60, 62 (FIG. 2) about which the U-shape portion may flex in order to accommodate rock shafts having different diameters.

The actuator arm 36 further comprises an extension portion 64 extending from one end of the U-shaped portion 54 and a bearing leg 66 extending from the extension portion 64 for engagement with the bearing surface 52 on the sensor arm 48. The bearing leg 66 is in sliding engagement with the bearing surface 52 and rotation of the rock shaft 22 about its axis will cause the bearing leg 66 to move relative to the position sensor 34 whereby the sensor arm 48 will assume a unique rotational position for any given rotational position of the rock shaft 22. During set-up of the depth control system, the relative position of the actuator arm 36 on the rock shaft 22 is adjusted such that the bearing surface 52 of the sensor arm 48 will be located adjacent to the extension portion 64 when the implement is in a fully lowered position, as illustrated in FIG. 3, and such that the bearing surface 52 will be located adjacent to the distal end of the bearing leg 66 when the implement is in the fully raised position, as illustrated in FIG. 4. Thus, the bearing surface 52 will slide across the bearing leg 66 throughout the range of rotation of the rock shaft 22.

It should be noted that the potentiometer 40 has approximately 120° of travel and that about 100° of travel is used in sensing the rotational position of the rock shaft 22, such that 10° of cushion is provided at either end of travel for the potentiometer 40 to thereby prevent damage resulting from over travel of the potentiometer 40. In addition, the configuration of the actuator arm 36 slidably engaged with the sensor arm 48 protects the sensor arm 48 from over travel conditions which may occur with a potentiometer rigidly affixed to the rock shaft. It should also be understood that the length of the sensor arm 48, as well as the length of the actuator arm 36 may be selected, depending upon the particular installation, to obtain the desired range of travel for the sensor arm 48, and that this is easily accommodated by the retrofit bolt-on structure provided by the present invention.

Referring to FIG. 2, the hydraulic valve 38 provides position control for actuation of the hydraulic cylinder 28 and includes a raise solenoid 68 and a lower solenoid 70 for controlling fluid flow through the hydraulic valve 38. The hydraulic valve 38 includes an inlet port 72 connected to a constant hydraulic fluid flow supply from a tractor, and an outlet port 74 for returning hydraulic fluid to the tractor. In addition, the hydraulic valve 38 includes a first port 76 and a second port 78 for delivering and receiving fluid to and from the hydraulic cylinder 28.

When the lower solenoid 68 is actuated by the monitor 32, it will open a fluid flow path from the inlet port 72 to the second port 78 whereby hydraulic fluid will be supplied to the bottom of the cylinder 28 to thereby retract the cylinder and raise the wheels 18, resulting in the frame 16 and associated tools 12, 14 being moved to a lowered position. Alternatively, when the solenoid 70 is actuated, fluid entering the inlet port 72 will be directed to the first port 76 to cause fluid to enter the top of the cylinder 28 and thereby cause extension of the cylinder 28 to move the wheel 18 downwardly and raise the frame 16 of the implement.

The monitor 32 includes a plurality of controls which may be manually actuated by an operator located on a tractor to which the monitor 32 is mounted. The monitor 32 includes a rotatable depth selection knob 80 which may be rotated to one of a plurality of preset, discrete working depth positions A through N wherein A is the shallowest working depth setting and N is the deepest working depth setting. The knob 80 is operable in an automatic mode of the monitor 32 to automatically position the implement tools 12, 14 to a predetermined depth setting. The actual position of the tools 12, 14 is determined by the rotational position of the rock shaft 22, as sensed by the position sensor 34. An input signal provided through an input line 82 permits the monitor to determine whether the cylinder 28 needs to be actuated to rotate the rock shaft 22 to raise or lower the implement frame 16, and an output signal is provided through an output line 84 to the hydraulic valve 38 whereby either the solenoid 68 or solenoid 70 is actuated to lower or raise, respectively, the implement frame 16 to position the rock shaft 22 at the preset position selected by the knob 80.

The monitor 32 also includes a rocker switch control 86 which is operable in a manual mode of operation for the monitor 32. The rocker switch 86 is normally biased to a neutral non-activated position. However, with the depth control system off, and the monitor 32 therefore in a manual mode of operation, an operator may depress either an upper section 88 of the switch 86 to cause the cylinder 28 to raise the implement frame 16 or may depress a lower section 90 of the switch 86 to cause the cylinder 28 to lower the implement frame 16. The cylinder 28 will only be actuated for the time during which either of the upper or lower sections 88, 90 are depressed, and upon release of either of the sections 88, 90, the switch 86 will return to its neutral position. Thus, the operator may manually select a position for the implement height through a continuous range of selected depths, but without the precision associated with the preset settings provided by the depth selection knob 80.

The monitor 32 is further provided with pressure sensitive switches including an on switch 92 for the depth control system, an off switch 94 for the depth control system, a raise to transport switch 96 and a lower to depth switch 98. The on switch 92 includes an LED (Light Emitting Diode) 100 which will light when the switch 92 is depressed indicating that the depth control system is on. The raise to transport switch 96 includes an LED 102 which, when the switch 96 is depressed, will flash as the monitor causes the cylinder 28 to move the frame 16 and associated tools 12, 14 to a fully raised position, while in the automatic positioning mode, in order to position the tools 12, 14 out of contact with the soil such as may be required during turning, clearing obstructions or passing through waterways. The lower to depth button 98 is also used in the automatic mode of operation to automatically lower the implement to the preset working depth selected by the knob 80 such as may be required after the raise to transport button 96 has been depressed. The lower to depth button 98 also includes an LED 104 which will flash as the implement moves to the selected depth position and which will glow solid once the selected position has been reached. With the lower to depth switch 98 activated, the monitor 32 will compare the signal from the position sensor 34 to the position selected by the depth selection knob 80 and adjust the position of the cylinder 28 accordingly. In addition, the operator may also turn the knob 80 to a new depth and the monitor 32 will cause the cylinder 28 to reposition the working depth of the implement to the new selected position. Thus, the controls on the monitor 32 provide the operator with on-the-go adjustment of the depth to match the tillage operation to varying soil conditions as they are observed by the operator.

As noted previously, manual operation of the system is possible through a separate rocker switch 86 on the monitor 32, which switch may be activated by depressing the off switch 94 of the depth control system to deactivate the automatic mode of operation. It may be desirable to use the manual mode of operation provided by the switch 86 in the event that there is a failure of the automatic function of the monitor 32 or if the operator feels that the automatic function is not required for a particular tillage operation.

The hydraulic valve 38 may further be provided with an optional open center solenoid valve 106 which is activated by solenoid 108, and the monitor 32 includes a switch 110 for activating the solenoid 108. The valve 106 is provided for use with tractors having an open center hydraulic system. The switch 110 enables the depth control system to be alternately switched from the monitor 32 between an open center and a closed center setting for the hydraulic system. The addition of the valve 106 enables the present system to be used with a wider range of tractors in that older tractors typically were provided with an open center hydraulic system, and the valve 106 provides an open flow path for hydraulic fluid to move through the valve 38 when the flow path to the cylinder 28 is closed, whereas modem closed center systems are typically designed with a flow path to compensate for the continuous hydraulic fluid flow when the cylinder 28 is not being actuated. In this manner, the present system, incorporating the valve 106, enables both open and closed systems to be used to provide the constant hydraulic fluid flow from the tractor to the valve 38 required by the present depth control system.

The monitor 32 is further provided with means for indicating an error or malfunction in the operation of the depth control system. Specifically, different combinations of the LEDs 100, 102, 104 are caused to flash to indicate different possible error conditions. For example, the LED 100 flashing by itself indicates that there is a problem at the monitor 32, for example a failed component within the monitor 32. The raise and lower LEDs 102 and 104 flashing simultaneously indicates that the depth control system cannot locate the selected implement position, which may be caused by a blockage in the flow of hydraulic fluid, a stuck or plugged valve, or a condition which prevents full rotation of the rock shaft 22. The flashing on LED 100 in combination with flashing of one of the raise or lower LEDs 102 or 104 indicates a short in the connection to the control valve 38, a short in one of the solenoids 68, 70 or a short in the circuit to the control valve 38. Finally, the on LED 100 flashing in combination with flashing of both the raise and lower LEDs 102 and 104 indicates a problem with the position sensor 34 which may be caused by a failure of the sensor 34 or improper adjustment between the sensor arm 48 and the actuator arm 36. Thus, the monitor 32 facilitates correction of any problems which may occur in the setup or operation of the depth control system and thereby reduces any trouble shooting time associated with use of the present depth control system.

Referring to FIG. 4, it should be noted that the valve 38 is attached to the frame 16 by a bracket 112 which extends around the frame 16. Further, it should be understood that all of the components of the present depth control system mounted to the frame 16 may be attached using the existing structure and bolts such that it is unnecessary to modify the frame, such as by providing drilled mounting holes, whereby the present invention is easily attached to the implement. Further, as noted with regard to cylinders 28A–F in FIG. 2, the present system is adapted to control varying members of cylinders 28 for adjusting the working depth of the implement wherein the cylinders 28A–F work in unison with each other, and the particular number of cylinders required may vary dependent upon the size of the implement.

In setting up the present depth control system for operation, an initial calibration is required and includes the steps of setting the control lever for the tractor hydraulic system to supply oil pressure to the valve 38 and deactivating the depth control system by pressing button 94 on the monitor 32. With the monitor 32 thus in the manual mode, the lower section 90 of the rocker switch 86 is depressed until the wheels 18 are fully retracted, and the depth selection knob 80 is then rotated to the N position. The depth control system is then activated by pressing the on switch 92, and the raise to transport switch 96 is then pressed in order to complete the calibration of the monitor 32. This procedure calibrates the monitor to operate through the full working range of the implement.

From the above description, it should be apparent that the present depth control system is easily calibrated and provides precise predictable positioning for selecting the working depth of an implement. Further, it should be apparent that the present system may be readily adapted to a wide range of implements and also provides an easily installed retrofit installation for the system. Also, by providing separate automatic and manual modes of operation for the present system, the operator is provided with improved control for positioning the working depth of an implement, as dictated by the particular working conditions in which the implement is operated.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A depth control system for use in combination with an implement having a frame, ground engaging tools, a frame supporting wheel mounted to a rockshaft rotatably supported on the frame, and a cylinder for moving the frame supporting wheel to a desired position to adjust the working depth of the tools, the depth control system comprising:

a monitor for receiving an input signal corresponding to the rotational position of a rockshaft on an implement, and for providing an output signal for positioning a frame supporting wheel at a predetermined position relative to an implement frame supported by the frame supporting wheel;

a hydraulic valve connected to said monitor for receiving said output signal in order to control flow of hydraulic fluid to a cylinder connected to the frame supporting wheel whereby the frame supporting wheel is positioned at a predetermined position to provide a desired working depth for the implement;

a position sensor connected to said monitor for providing said input signal to said monitor, said position sensor including a movable sensor arm;

an actuator arm for contacting said movable sensor arm, said actuator arm including a mounting bracket for attaching said actuator arm to the rockshaft of the implement;

said movable sensor arm including a bearing surface, and said actuator arm including a distal end, distal from the rockshaft extending to contact said bearing surface wherein rotation of said actuator arm with said rockshaft about a rotational axis of said rockshaft causes said distal end to slide relative to said bearing surface of said sensor arm resulting in a continuous range of contact points between said bearing surface and said distal end; and wherein said actuator arm moves said movable sensor arm in response to movement of the frame supporting wheel and corresponding rotation of the rockshaft supporting said actuator arm whereby said monitor is provided with said input signal to enable said monitor to compare the position of the rockshaft corresponding to said input signal to an operator selected working depth for the implement.

2. The system of claim 1 wherein said position sensor comprises a potentiometer providing a continuous range of input signals to said monitor.

3. The system of claim 2 wherein said movable sensor arm is rotatable about a pivot axis such that rotation of said actuator arm causes rotation of said sensor arm about said pivot axis.

4. The system of claim 1 wherein said hydraulic valve includes a solenoid actuated mechanism for alternately configuring said hydraulic valve for an open center and a closed center hydraulic system.

5. The system of claim 1 wherein said monitor includes controls for selectively positioning the frame supporting wheel, said controls providing a plurality of positions for the frame supporting wheel between a position supporting the frame in a fully raised position and a position supporting the frame in a fully lowered position.

6. The system of claim 5 wherein said monitor has an automatic mode of operation and a manual mode of operation, said automatic mode of operation including a plurality of preset, discrete positions for the frame supporting wheel selectable by one of said controls, and another one of said controls operable in said manual mode of operation for moving the frame supporting wheel through a continuous range of positions.

7. The system of claim 1 wherein the mounting bracket of the actuator arm comprises a saddle clamp for extending around the rockshaft of the implement for providing a releasable mounting for said actuator arm whereby the position of said distal end of said actuator arm relative to said bearing surface is adjustable through rotation of said actuator arm relative to said rockshaft.

8. A depth control system in combination with an implement having a frame, ground engaging tools, a frame supporting wheel mounted to a rockshaft rotatably supported on the frame, and an actuator mechanism including a hydraulic cylinder for moving the frame supporting wheel to a desired position to adjust the working depth of the tools, the depth control system comprising:

a monitor for mounting on a tractor connected to the implement;

a position sensor mounted to said frame of said implement and connected to said monitor for providing an input signal to said monitor corresponding to a sensed rotational position of said rockshaft;

a hydraulic valve for connection to a hydraulic system for a tractor, said hydraulic cylinder connected to said hydraulic valve and actuated in movement by hydraulic fluid conveyed through said valve, and said valve including a solenoid electrically connected to a switch on said monitor for alternately configuring said valve for open center operation, providing an open flow path through said valve when flow to said hydraulic cylinder is prevented, and closed center operation, preventing fluid flow through said valve when flow to said hydraulic cylinder is prevented; and wherein said monitor generates an output signal for controlling said actuator mechanism whereby said actuator mechanism is activated to move said frame supporting wheel to an operator selected position.

9. The depth control system of claim 8 wherein said monitor has an automatic mode of operation and a manual mode of operation, said automatic mode of operation including a plurality of preset, discrete positions for the frame supporting wheel, said monitor including a control for selecting each of said preset, discrete positions.

10. The depth control system of claim 9 wherein said monitor includes a control for further selectively activating said actuator mechanism in said manual mode of operation to raise and lower said frame supporting wheel through a continuous range of positions relative to said frame.

11. The depth control system of claim 8 including an actuator arm mounted to said rockshaft and positioned in engagement with said position sensor for conveying movement of said rockshaft to said position sensor.

12. The depth control system of claim 11 wherein said actuator arm is releasably clamped to said rockshaft and is rotatable around said rockshaft for adjusting the position of said actuator arm relative to said position sensor.

13. The depth control system of claim 11 wherein said position sensor includes a movable portion having a bearing surface and said actuator arm is in sliding engagement with said bearing surface.

14. The depth control system of claim 8 wherein said hydraulic valve includes a first solenoid and a second solenoid, said first solenoid actuating said valve to provide a fluid path to said cylinder for moving said frame supporting wheel in a first direction relative to said frame and said second solenoid actuating said valve to provide a fluid path to said cylinder for moving said frame supporting wheel in a second, opposite direction.

15. A depth control system in combination with an implement having a frame, ground engaging tools, a frame supporting wheel mounted to a rockshaft rotatably supported on the frame, and an actuator mechanism for moving the frame supporting wheel to a desired position to adjust the working depth of the tools, the depth control system comprising:

a monitor for mounting on a tractor connected to the implement;

a position sensor mounted to said frame of said implement and connected to said monitor for providing an input signal to said monitor corresponding to a sensed rotational position of said rockshaft, said position sensor including a bearing surface;

an actuator arm releasably clamped to said rockshaft and including a distal end, distal from said rockshaft, in contact with said bearing surface of said position sensor, said actuator arm being rotatable around said rockshaft for adjusting a point of contact of said distal end of said actuator arm relative to said bearing surface of said position sensor; and wherein said monitor generates an output signal for controlling said actuator mechanism whereby said actuator mechanism is activated to move said frame supporting wheel to an operator selected position.

16. The depth control system of claim 15 wherein said position sensor includes a movable sensor arm which is mounted for rotation about a pivot axis.

17. The depth control system of claim 16 wherein said movable arm includes said bearing surface and said distal end of said actuator arm is in sliding engagement with said bearing surface.

18. The depth control system of claim 15 wherein said monitor has an automatic mode of operation and a manual mode of operation, said automatic mode of operation including a plurality of preset, discrete positions for the frame supporting wheel, said monitor including a control for selecting each of said preset, discrete positions.

19. The depth control system of claim 18 wherein said monitor includes a further control for selectively activating said actuator mechanism in said manual mode of operation to raise and lower said frame supporting wheel through a continuous range of positions relative to said frame.

* * * * *